United States Patent
Saeki

(10) Patent No.: US 6,463,671 B1
(45) Date of Patent: Oct. 15, 2002

(54) MICROMETER

(75) Inventor: Akitomo Saeki, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 33 days.

(21) Appl. No.: 09/705,877

(22) Filed: Nov. 6, 2000

(30) Foreign Application Priority Data

Nov. 10, 1999 (JP) .......................... 11-319640

(51) Int. Cl.$^7$ ................................................ G01B 3/18
(52) U.S. Cl. ............................ 33/815; 33/831; 33/815
(58) Field of Search .................... 33/813, 814, 815, 33/817, 831

(56) References Cited

U.S. PATENT DOCUMENTS

| | | | | |
|---|---|---|---|---|
| 141,915 A | * | 8/1873 | Bonnaz | 33/815 |
| 350,513 A | * | 10/1886 | Washburn | 33/815 |
| 1,143,007 A | * | 6/1915 | Wilcox | 33/815 |
| 1,267,075 A | * | 5/1918 | Hubbell | 33/815 |
| 2,267,332 A | * | 12/1941 | Hagstrom | 33/815 |
| 2,463,261 A | * | 3/1949 | Goodspeed | 33/815 |
| 2,835,979 A | * | 5/1958 | Metevia | 33/815 |
| 6,176,021 B1 | * | 1/2001 | Sato et al. | 33/813 |
| 6,260,286 B1 | * | 7/2001 | Suzuki et al. | 33/813 |

FOREIGN PATENT DOCUMENTS

| | | | |
|---|---|---|---|
| EP | 0646764 A2 | 4/1995 | |
| EP | 0791801 A2 | 8/1997 | |
| EP | 0864845 A2 | 9/1998 | |
| EP | 0947801 A2 | 10/1999 | |
| JP | 58015101 A | * 1/1983 | 33/815 |
| JP | 7-103749 A | 4/1995 | |

* cited by examiner

Primary Examiner—Diego Gutierrez
Assistant Examiner—Mirellys Jagan
(74) Attorney, Agent, or Firm—Oliff & Berridge, PLC

(57) ABSTRACT

A thimble (5) and a spindle (4) are rotated through a first constant-force device (70) by rotating an operation sleeve (6) integrally having a first operation section (61) and a second operation section (62). When a more than predetermined load is applied to the spindle (4), the first constant-force device (70) is actuated to spin the operation sleeve (6) idly. Since the operation sleeve (6) integrally has the first operation section (61) and the second operation section (62), both double-handed operation for holding the frame by left hand and rotating the first operation section (61) by right hand and single-handed operation for holding the frame and rotating the second operation section (62) with a single-handed are possible while retaining the same operability as in conventional operation during measurement.

4 Claims, 3 Drawing Sheets

MICROMETER

BACKGROUND OF THE INVENTION

1. Field of the Invention

The present invention relates to a micrometer for measuring dimension of a workpiece such as length and thickness.

2. Description of Related Art

In FIG. 3, a conventional micrometer 100 (first conventional art) has an approximately U-shaped frame 101, an anvil 102 held at one end of the frame 101, a spindle 104 screwed to the other end of the frame 101 through a retainer sleeve 103 and moved toward and away from the anvil 102, a thimble 105 secured to the spindle 104 and fitted to an outer circumference of the retainer sleeve 103, and a ratchet mechanism 106 provided to a rear end of the spindle 104 for idly spinning when a more than predetermined load is applied to the spindle 104.

Though not shown, the ratchet mechanism 106 has a pair of ratchet wheels meshing with each other and a compression helical spring for biasing the ratchet wheels in a direction to mesh each other, the ratchet wheels spinning idly when a more than predetermined load is applied to the spindle 104.

During measurement, the frame 101 is held by left hand and the thimble 105 is rotated by right hand to sandwich a workpiece between the anvil 102 and the spindle 104. When the ratchet mechanism 106 is operated (rotated) by right hand while sandwiching the workpiece, the ratchet wheel idly spins with the more than predetermined load being applied to the spindle 104, so that the spindle 104 stops rotating, thus keeping constant measuring pressure.

Another example of micrometer is shown in Japanese Patent Laid-Open Publication No. Hei 7-103749 (second conventional art).

Similarly to the micrometer 100 of the above-described first conventional art, the micrometer according to the second conventional art has a frame, an anvil, a retainer sleeve, a spindle and a thimble. A constant-force device provided to the micrometer has a plate spring provided on an outer circumference of rear end of the retainer sleeve, and a ratchet wheel in contact with a proximal end of the plate spring and provided to an inner circumference of the thimble. The constant-force device allows the thimble to spin idly by elastic deformation of the plate spring when a more than predetermined load is applied between the thimble and the retainer sleeve.

During measurement, the thimble is rotated while holding the frame with one hand. When the thimble is further rotated during the above condition to apply more than predetermined load the spindle (between the thimble and the retainer sleeve), the thimble spins idly, thus keeping constant measuring pressure of the spindle during measurement.

The micrometer according to the above first conventional art is mainly used for measurement with both hands and the micrometer of the above second conventional art is mainly used for measurement with single-handed. No single micrometer can be used for both of single-handed operation and double-handed operation.

In this case, the constant-force device of the first conventional art and the second conventional art may be installed in a single micrometer for both the single-handed operation and the double-handed operation. However, according to the above arrangement, since the constant-force device of the first conventional art functions during single-handed operation and the constant-force device of the second conventional art functions during double-handed operation, the measuring pressure may differ according to type of operation, thus increasing measurement error.

Further, since the micrometer of the first conventional art and the second conventional art requires separate component according to the type of the constant-force device, the number of required components increases. Further, when both of the constant-force devices are installed in a single micrometer, the number of required components for one micrometer is increased, so that production cost is increased and measurement error may be likely to occur.

SUMMARY OF THE INVENTION

An object of the present invention is to provide a micrometer capable of measuring by both of single-handed operation and double-handed operation and capable of obtaining identical operability during single-handed operation and double-handed operation during respective measurement, thus reducing required number of components and eliminating measurement error according to type of operation.

A micrometer according to the present invention has: an approximately U-shaped frame; an anvil held on one end of the frame; a spindle screwed to the other end of the frame through a retainer sleeve and movable toward and away from the anvil; a thimble secured to the spindle and fitted to an outer circumference of the retainer sleeve. The micrometer is characterized in having: an operation sleeve rotatable relative to the spindle, the operating sleeve integrally having, on an outer side of an end remote from the end opposing the anvil, a first operation section with a smaller diameter than the diameter of the retainer sleeve and a second operation section fitted to an outer circumference of the thimble; and a constant-force device provided on either between the first operation section of the operation sleeve and the outer end of the spindle or between the second operation section of the operation sleeve and the outer circumference of the thimble, the constant-force device idly spinning when a more than predetermined load is applied to the spindle.

In the present invention, the thimble and the spindle are rotated through either the first constant-force device or the second constant-force device by rotating the operation sleeve integrally having the first operation section and the second operation section.

During measurement, the operation sleeve is rotated while disposing a workpiece between the anvil and the spindle, thus sandwiching the workpiece between the anvil and the spindle. The operation sleeve is further rotated under the above condition, so that either the first constant-force device or the second constant-force device is actuated when a more than predetermined load is applied to the spindle, thus idly spinning the operation sleeve. Since the operation sleeve integrally has the first operation section and the second operation section, the operation sleeve is rotated in a predetermined direction by either the double-handed operation for holding the frame by left hand and rotating the first operation section by right hand or by single-handed operation for holding the frame and rotating the second operation section with a single-handed. Further, during both operations, the same operability as in the conventional operation can be obtained.

Since the arrangement of the frame, anvil, retainer sleeve, spindle, thimble and operation sleeve can be commonly used both in providing the first constant-force device to the first accommodation space and second constant-force device to the second accommodation space, the number of components can be reduced.

Since only one constant-force device is installed in the micrometer, there is not measurement error between measurement by the single-handed operation and the double-handed operation.

In the present invention, a first accommodation space and a second accommodation space for accommodating the constant-force device may preferably formed respectively between the first operation section of the operation sleeve and the outer end of the spindle and between the second operation section of the operation sleeve and the outer circumference of the thimble.

According to the above arrangement, since the first accommodation space and the second accommodation space for accommodating the constant-force devices are formed to the micrometer, one of the constant-force devices can be installed to one of the accommodation spaces, thus easily constructing the micrometer having either the first constant-force device or the second constant-force device. Further, the constant-force device can be selected from a plurality of devices, and the constant-force device can be easily exchanged.

In the present invention, the first constant-force device accommodated in the first accommodation space may preferably include: a first ratchet wheel fixed to an inner circumference of the first operation section; a second ratchet wheel meshing with the first ratchet wheel and unrotatable and displaceable relative to the spindle in an axis direction; and a compression coil spring for biasing the second ratchet wheel toward the first ratchet wheel, the second constant-force device accommodated in the second accommodation space having an elastic member with one end being engaged to either one of the outer circumference of the thimble and the inner circumference of the second operation section and the other end being in contact with the other one of the outer circumference of the thimble and the inner circumference of the second operation section.

According to the above arrangement, since the first constant-force device and the second constant-force device employing known technique can be selectively installed to the micrometer, the micrometer capable of both the single-handed operation and the double-handed operation can be easily constructed. Further, the same touch (such as sound and operation feeling) as in the conventional ratchet constant-force device can be obtained in the first constant-force device and the same touch as so-called friction constant-force device using spring can be obtained in the second constant-force device.

In the present invention, a section of the thimble fitted to the second operation section may preferably be thinner than a section of the thimble not fitted to the second operation section.

According to the above arrangement, since the section fitted to the second operation section of the thimble is thinner than the section not fitted to the second operation section, the diameter of the second operation section can be reduced, thus retaining operability and size of a conventional micrometer.

DETAILED DESCRIPTION OF PREFERRED EMBODIMENT(S)

Figure 1:
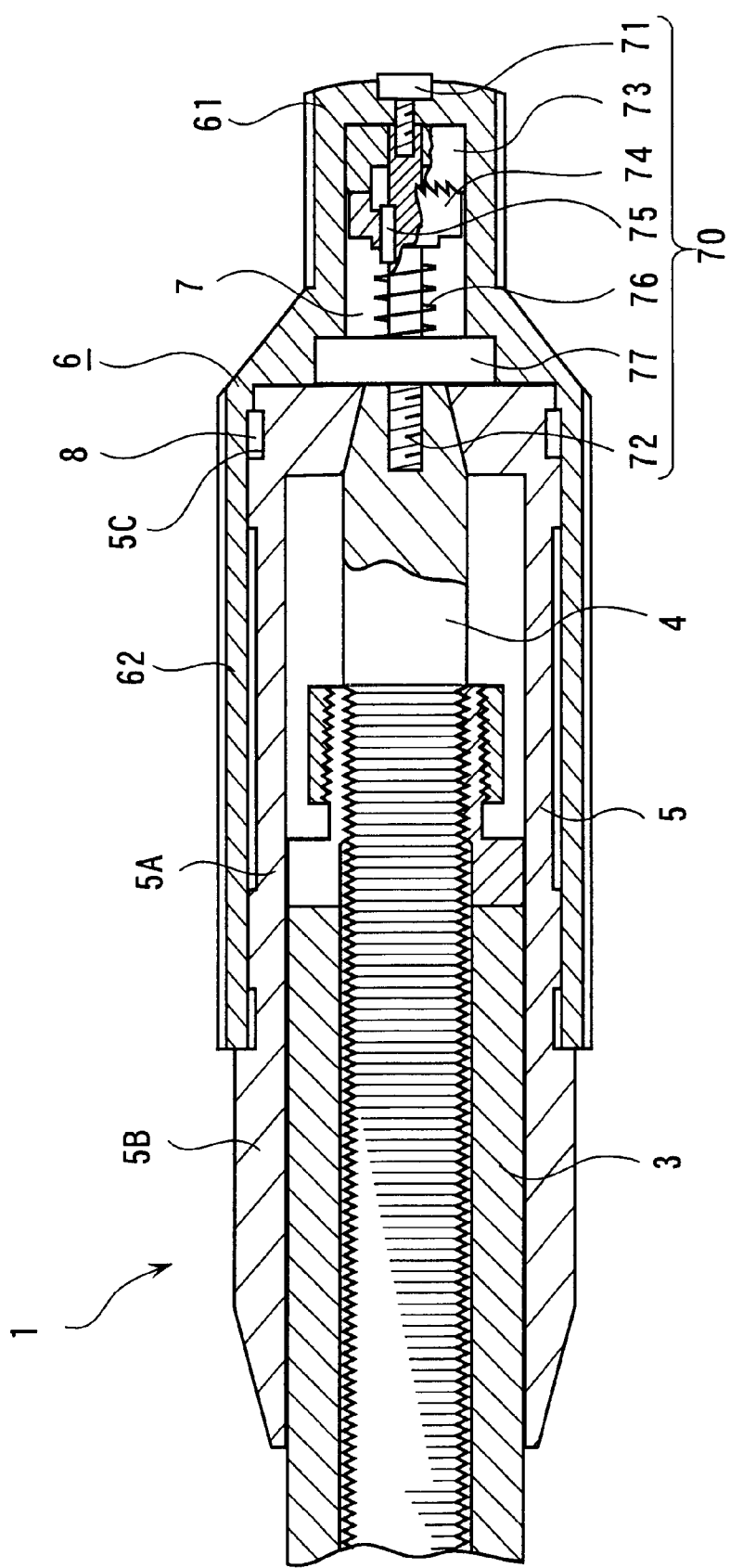
FIG. 1 is a cross section showing a primary portion (first constant-force device) of a micrometer according to an embodiment of the present invention.
Figure 2:
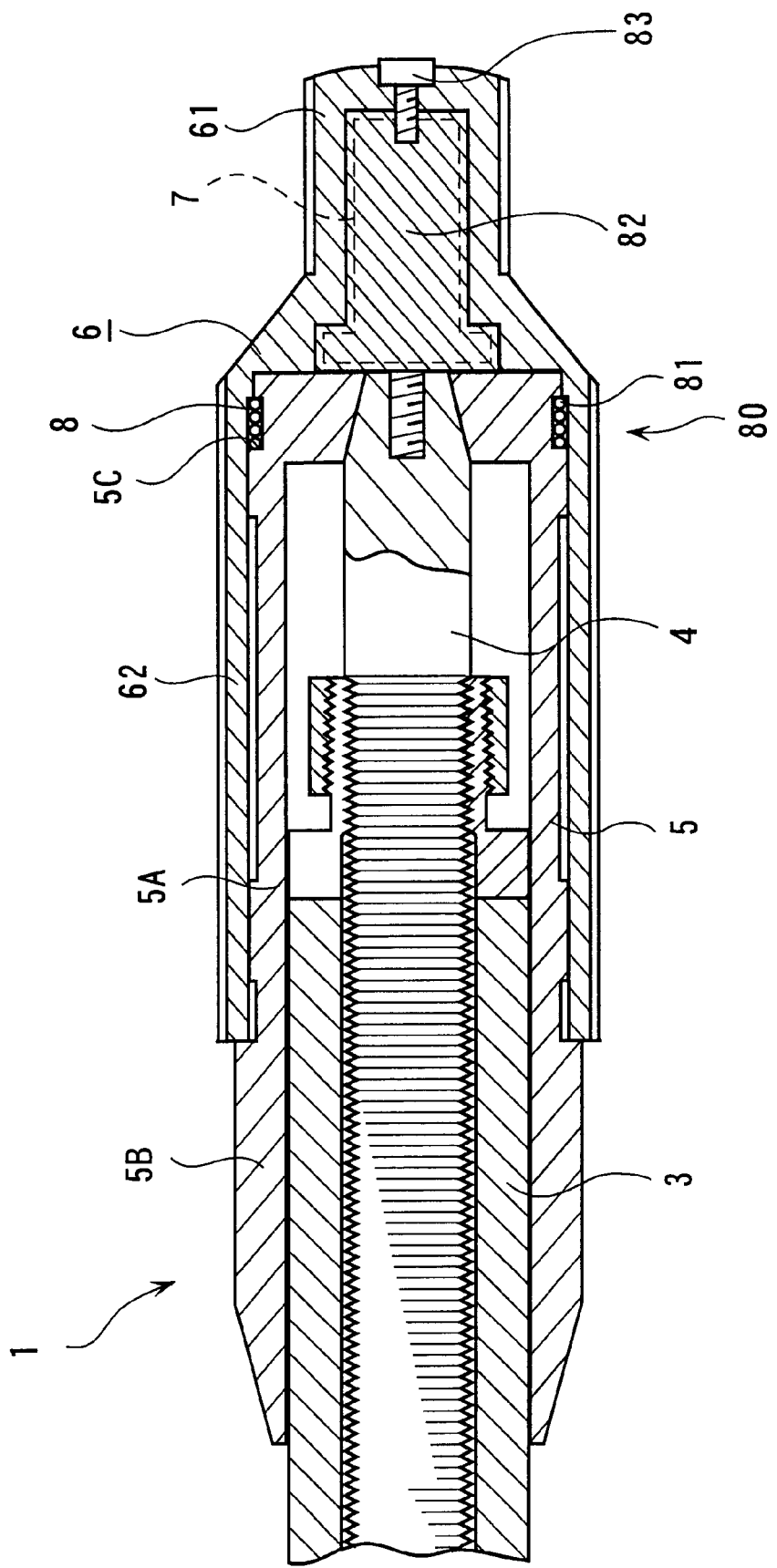
FIG. 2 is a cross section showing another primary portion (second constant-force device) of the aforesaid embodiment.
Figure 3:
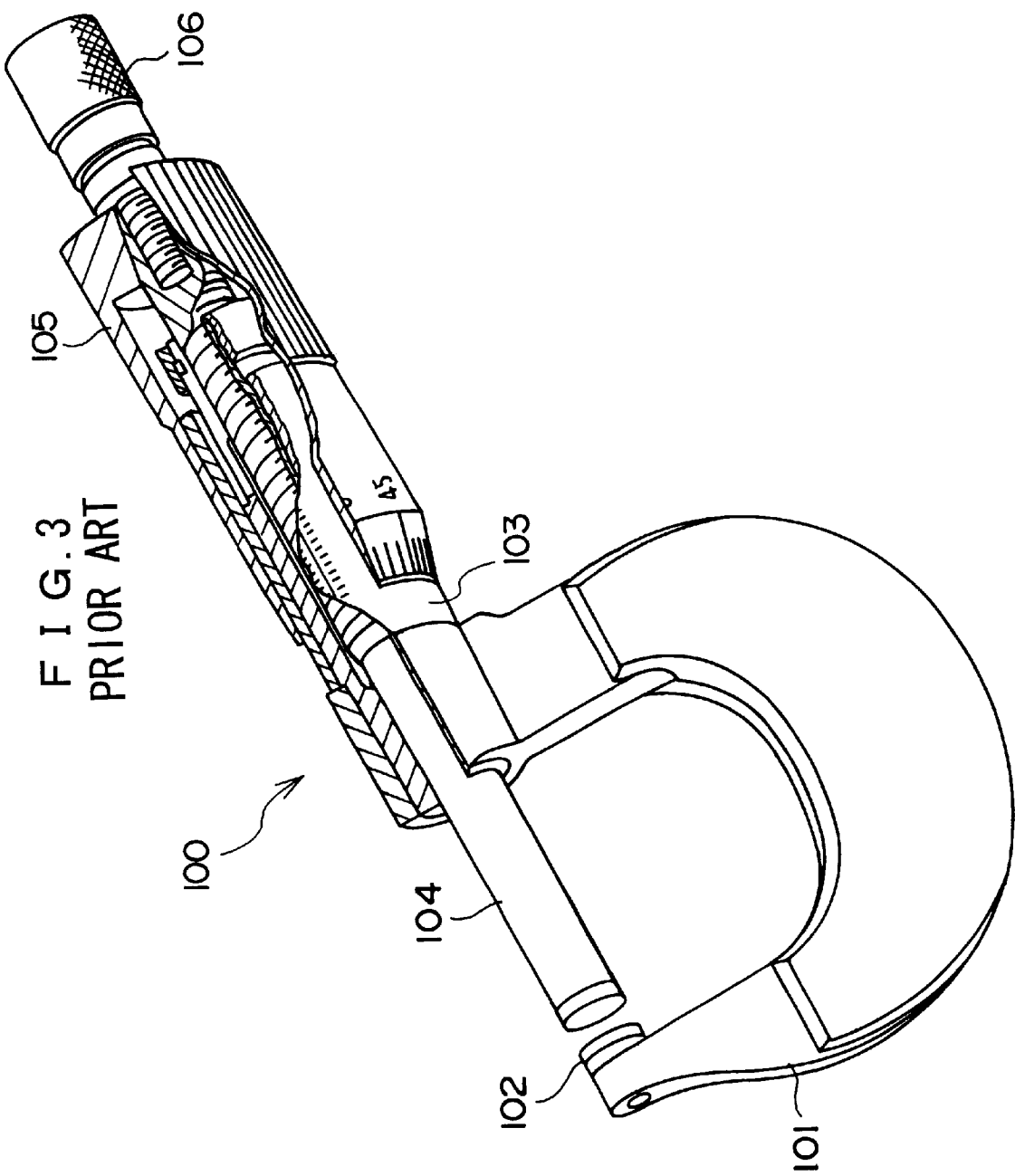
FIG. 3 is an entire perspective view showing a conventional micrometer.

As shown in FIGS. 1 and 2, a micrometer 1 according to the present embodiment has an approximately U-shaped frame (not shown), an anvil (not shown) held at one end of the frame, a spindle 4 screwed to the other end of the frame through a retainer sleeve 3 and moved toward and away from the anvil, a thimble 5 secured to the spindle 4 and fitted to an outer circumference of the retainer sleeve 3 as in the micrometer 100 of the aforesaid first conventional art.

On an outer side of an end remote from the end opposing the anvil, the micrometer 1 is provided with an operation sleeve 6 rotatable relative to the spindle 4 and integrally having a first operation section 61 with a smaller diameter than the diameter of the retainer sleeve 3 and a second operation section 62 fitted to an outer circumference of the thimble 5.

A section 5A of the thimble 5 fitted to the second operation section 62 is thinner than a section 5B not fitted to the second operation section 62. A circular groove 5C is formed on an outer circumference of the rear end of the thimble 5.

A first accommodation space 7 and a second accommodation space 8 are formed to the micrometer 1 respectively between the first operation section 61 of the operation sleeve 6 and the outer end of the spindle 4, and between the groove 5C formed on the outer circumference of the thimble 5 and the second operation section 62. Below-described first constant-force device 70 (see FIG. 1) and second constant-force device 80 (see FIG. 2) are selectively accommodated in the first and the second accommodation spaces 7 and 8.

As shown in FIG. 1, the first constant-force device 70 has a shaft 72 with one end screwed to the outer end of the spindle 4 and the other end rotatably supporting the operation sleeve 6 through the screw 71, a first ratchet wheel 73 secured to an inner circumference of the first operation section 61, a second ratchet wheel 74 meshed with the first ratchet wheel 73 in a rotatable and displaceable manner in axial direction relative to the spindle 4 though a key 75, a compression helical spring 76 for biasing the second ratchet wheel 74 toward the first ratchet wheel 73, and a stopper 77 fixed to the shaft 72 for defining a position of the compression helical spring 76.

The first ratchet wheel 73 and the second ratchet wheel 74 have a indented tooth meshing with each other formed at a regular pitch, where the first ratchet wheel 73 spins idly relative to the second ratchet wheel 74 when a more than predetermined load is applied to the spindle 4.

When the operation sleeve 6 is rotated, the first ratchet wheel 73 fixed to the operation section 61 is integrally rotated. Since the first ratchet wheel 73 and the second ratchet wheel 74 are meshed, the second ratchet wheel 74 is also rotated. The shaft 72 is rotated through the key 75 in accordance with the rotation of the second ratchet wheel 74, so that the spindle 4 screwed to the shaft 72 and the thimble 5 integrally mounted to the spindle 4 is rotated together.

On the other hand, when the operation sleeve 6 is further rotated to rotate the first ratchet wheel 73 while applying a more than predetermined load to the spindle 4, since the second ratchet wheel 74 is unable to further rotate, the second ratchet wheel 74 escapes toward the compression helical spring 76 along the key 75 against spring force of the compression helical spring 76. In other words, rotation force of the first ratchet wheel 73 is not transmitted to the second ratchet wheel 74, thus idly spinning the operation sleeve 6.

As shown in FIG. 2, the second constant-force device 80 has a helical spring 81 as an elastic member with one end being engaged to the outer circumference of the thimble 5 and the other end being in contact with inner circumference of the second operation section 62 of the operation sleeve 6, the helical spring 81 being wound around the groove 5C at the rear end of the thimble 5. When the second constant-force device 80 is provided, a holding block 82 having one end screwed by a screw 83 to the spindle 4 and the other end rotatably holding the operation sleeve 6 is provided in the first accommodation space 7. Incidentally, the holding block 82 may be fonned in a shape corresponding to the first accommodation space 7, thus enhancing rigidity of the first operation section 61.

When the operation sleeve 6 is rotated, since the other end of the helical spring 81 is in contact with the inner circumference of the second operation section 62, the thimble 5 engaged to one end of the helical spring 81 is also rotated, so that the spindle 4 integrally provided on the thimble 5 is rotated together with the operation sleeve 6.

On the other hand, when a more than predetermined load is applied to the spindle 4 (between the thimble 5 and the operation sleeve 6), the other end of the helical spring 81 slips relative to the second operation section 62. In other words, the rotation force of the operation sleeve 6 is not transmitted to the thimble 5, so that the operation sleeve 6 spins idly.

Next, a function of the present embodiment will be described below.

The operation sleeve 6 is rotated in a predetermined direction while disposing a workpiece between the anvil and the spindle 4. Specifically, the operation sleeve 6 is rotated in a predetermined direction by either the double-handed operation for holding the frame with left hand and rotating the first operation section 61 with right hand or by single-handed operation for holding the frame and rotating the second operation section 62 with a single-handed. Then, the rotation force of the operation sleeve 6 is transmitted to the spindle 4 and the thimble 5 through the first constant-force device 70 or the second constant-force device 80. When the operation sleeve 6 is further rotated after one end of the spindle 4 is in contact with the workpiece, since a more than predetermined load is applied to the spindle 4, either the first constant-force device 70 or the second constant-force device 80 is actuated to idly spin the operation sleeve 6. Specifically, the first ratchet wheel 73 slips relative to the second ratchet wheel 74 in the first constant-force device 70, or the other end of the helical spring 81 slips relative to the inner circumference of the second operation section 62 in the second constant-force device 80.

According to the present embodiment, following effect can be obtained.

In the present invention, the thimble 5 and the spindle 4 are rotated through either the first constant-force device 70 or the second constant-force device 80 by rotating the operation sleeve 6 integrally having the first operation section 61 and the second operation section 62.

During measurement, the operation sleeve 6 is rotated while disposing a workpiece between the anvil and the spindle 4, thus sandwiching the workpiece between the anvil and the spindle 4. The operation sleeve 6 is further rotated under the above condition, so that either the first constant-force device 70 or the second constant-force device 80 is actuated when a more than predetermined load is applied to the spindle 4, thus idly spinning the operation sleeve. Since the operation sleeve 6 integrally has the first operation section 61 and the second operation section 62, the operation sleeve 6 is rotated in a predetermined direction by either the double-handed operation for holding the frame by left hand and rotating the first operation section 61 by right hand or by single-handed operation for holding the frame and rotating the second operation section 62 with a single-handed. Further, during both operations, the same operability as in the conventional operation can be obtained.

Since the arrangement of the frame, anvil, retainer sleeve 3, spindle 4, thimble 5 and operation sleeve 6 can be commonly used both in providing the first constant-force device 70 to the first accommodation space 7 and second constant-force device 80 to the second accommodation space 8, the number of components can be reduced.

Since only one constant-force device is installed in the micrometer 1, there is not measurement error between measurement by the single-handed operation and the double-handed operation.

Since the first accommodation space 7 and the second accommodation space 8 for accommodating the constant-force devices 70 and 80 are formed to the micrometer 1, one of the constant-force devices can be installed to one of the accommodation spaces, thus easily constructing the micrometer 1 having either the first constant-force device 70 or the second constant-force device 80. Further, the constant-force device can be selected from a plurality of devices, and the constant-force device can be easily exchanged.

Since the first constant-force device 70 and the second constant-force device 80 employing known technique can be selectively installed to the micrometer 1, the micrometer 1 capable of both the single-handed operation and the double-handed operation can be easily constructed. Further, the same touch (such as sound and operation feeling) as in the conventional ratchet constant-force device can be obtained in the first constant-force device 70 and the same touch as so-called friction constant-force device using spring can be obtained in the second constant-force device 80.

Since the section 5A of the thimble 5 fitted to the second operation section 62 is thinner than the section 5B not fitted to the second operation section 62, the diameter of the second operation section 62 can be reduced, thus retaining operability and size of a conventional micrometer.

In scope of the present invention is not restricted to the above-described embodiments, but includes modifications and improvements as-long as an object of the present invention can be attained.

For instance, though a helical spring 81 is used as the elastic member of the second constant-force device 80 in the above embodiment, the elastic member according to the present invention is not restricted to the above arrangement, but another component that works as the elastic member such as a plate spring may be used.

Though the section SA fitted to the second operation section 62 of the thimble 5 is thinner than the section 5B not fitted to the second operation section 62 in the above embodiment, the shape of a conventional thimble may be used in the present invention.

Though the section 5A of the thimble 5 fitted to the second operation section 62 is thinner than the section 5B not fitted to the second operation section 62 in the above embodiment, the shape of a conventional thimble may be used in the present invention.

What is claimed is:

1. A micrometer comprising:

an approximately U-shaped frame;

an anvil held on one end of the frame;

a spindle screwed to an other end of the frame through a retainer sleeve and movable toward and away from the anvil;

a thimble secured to the spindle and fitted to an outer circumference of the retainer sleeve;

an operation sleeve rotatable relative to the spindle, the operation sleeve integrally having, on an outer side of an end of said operation sleeve remote from an end opposing the anvil, a first operation section with a smaller diameter than the diameter of the retainer sleeve and a second operation section fitted to an outer circumference of the thimble; and a constant-force device provided on either between the first operation section of the operation sleeve and an outer end of the spindle remote from the anvil or between the second operation section of the operation sleeve and the outer circumference of the thimble, the constant-force device idly spinning when a more than predetermined load is applied to the spindle.

2. The micrometer according to claim 1, wherein a first accommodation space and a second accommodation space for accommodating the constant-force device are formed respectively between the first operation section of the operation sleeve and the outer end of the spindle and between the second operation section of the operation sleeve and the outer circumference of the thimble.

3. The micrometer according to claim 2, the constant-force device accommodated in the first accommodation space comprising: a first ratchet wheel fixed to an inner circumference of the first operation section; a second ratchet wheel meshing with the first ratchet wheel and unrotatable and displaceable relative to the spindle in an axis direction; and a compression coil spring for biasing the second ratchet wheel toward the first ratchet wheel, the constant-force device accommodated in the second accommidation space having an elastic member with one end being engaged to either one of the outer circumference of the thimble and the inner circumference of the second operation section and the other end being in contact with the other one of the outer circumference of the thimble and the inner circumference of the second operation section.

4. The micrometer according to claim 1, wherein a section of the thimble fitted to the second operation section being thinner than a section of the thimble not fitted to the second operation section.

* * * * *